United States Patent [19]

Johnson et al.

[11] Patent Number: 5,036,939

[45] Date of Patent: Aug. 6, 1991

[54] MULTIPLE AXLE DRIVE VEHICLE WITH OVERRUNNING ROLLER CLUTCH HUBS

[75] Inventors: Mitchell Johnson; Robert Eastman, both of Roseau, Minn.; David C. Ochab, Horseheads, N.Y.

[73] Assignees: Polaris Industries L.P., Roseau, Minn.; Hilliard Corporation, Elmira, N.Y.

[21] Appl. No.: 391,774

[22] Filed: Aug. 9, 1989

Related U.S. Application Data

[63] Continuation-in-part of Ser. No. 86,468, Aug. 28, 1987, abandoned.

[51] Int. Cl.$^5$ .................... B60K 17/34; B60K 17/354
[52] U.S. Cl. .................................... 180/233; 180/247; 180/249; 192/38; 192/50
[58] Field of Search .................... 192/38, 36, 35, 50, 192/54; 180/233, 247, 248, 249

[56] References Cited

U.S. PATENT DOCUMENTS

| | | | |
|---|---|---|---|
| 2,334,734 | 11/1943 | Taylor | 192/54 |
| 3,123,169 | 3/1964 | Young et al. | 192/38 |
| 3,300,002 | 1/1967 | Roper | 192/38 |
| 3,406,798 | 10/1968 | Curran | 192/38 |
| 3,414,096 | 12/1968 | Reed | 192/38 |
| 3,472,349 | 10/1969 | Ainsworth | 192/35 |
| 3,476,226 | 11/1969 | Massey | 192/38 |
| 3,481,436 | 12/1969 | Wilkowski | 192/35 |
| 3,788,435 | 1/1974 | Prueter | 192/35 |
| 4,222,472 | 9/1980 | Telford | 192/38 |
| 4,620,621 | 11/1986 | Kulczycki et al. | 192/38 |
| 4,643,284 | 2/1987 | Hardt et al. | 192/50 |

FOREIGN PATENT DOCUMENTS

461410 6/1928 Fed. Rep. of Germany ........ 192/50

Primary Examiner—Mitchell J. Hill
Attorney, Agent, or Firm—Gregory P. Kaihoi

[57] ABSTRACT

A multiple driven axle vehicle, such as a four-wheel drive recreational vehicle having its front, steerable wheels being optionally driven by providing double acting overrunning clutches in the hubs of the front wheels. A transmission mechanism is provided for driving the front, optionally driven wheels slower than the driving surface otherwise drives those wheels so that the slower driven wheels overrun and do not engage when the steerable wheels are turned as the vehicle is driven through a turn, thereby eliminating the need for a differential between the steerable wheels and between the front and rear wheels. The overrunning roller clutches of the optionally driven hubs desirably include an intermittent friction apparatus operative between the roller cage and the vehicle chassis to intermittently exert a force tending to retard rotation of the cage with respect to the chassis, thereby indexing the roller cage and rollers to the forward or reverse engagable position. The intermittent nature of the friction permits the roller cage and rollers to return to the central, neutral position when rotation of the cage with respect to the chassis stops. The roller clutches further include a generally cylindrical cam driven by the transmission and located radially inward of the rollers and roller cage. The cam surface includes a ridge associated with at least some of the rollers for inhibiting inertial movement of the rollers from the forward engagable position to the reverse engagable position, as for example during sudden braking.

24 Claims, 8 Drawing Sheets

MULTIPLE AXLE DRIVE VEHICLE WITH OVERRUNNING ROLLER CLUTCH HUBS

This Application is a continuation-in-part application of parent application Ser. No. 086,468 filed Aug. 28, 1987, now abandoned.

TECHNICAL FIELD

The invention relates to multiple driven axle vehicles, such as four wheel drive vehicles, and the application of unique overrunning roller clutches to such vehicles.

BACKGROUND ART

Multiple driven axle vehicles, such as four wheel drive vehicles have utilized a variety of means for accomplishing four wheel drive function. Difficulties encountered in designing multiple axle drive systems have given rise to a variety of proposed solutions. A significant problem encountered is providing an effective and economical differential between left and right wheels on the steering axle and between axles during four wheel driving to prevent tire scrubbing which not only causes excessive tire wear but also impairs the driver's ability to control the vehicle. Many vehicles, such as automobiles, utilize relatively expensive and heavy differentials between wheels on the same axle and transfer cases between axles to permit all wheels to rotate at different speeds, thus preventing tire scrubbing and handling problems during cornering.

Due to a variety of reasons relating to such things as handling and economy, four wheel drive vehicles such as pick ups typically require the optionally driven axle to be manually engaged by the driver. Thus, when four wheel drive is not required, the vehicle is operated in two wheel drive mode; the optionally driven wheels ar engaged manually by the driver when the driver considers four wheel drive to be necessary or desirable. Such systems have obvious disadvantages in that they are not automatic and the driver must continually be conscious of the condition of the driving surface to decide whether two wheel drive or four wheel drive is appropriate.

Vehicles such as all terrain vehicles (ATV's) typically are driven on all types of terrain including pavement, grass, dirt, snow, ice, gravel, and even shallow water. Such vehicles frequently are utilized off road where terrain changes occur frequently and rapidly. Four wheel drive capability is particularly valuable for such vehicles to enhance their ability to travel safely over all types of terrain without getting stuck. Four wheel drive systems on ATV's typically have included either a full slip differential or a limited slip differential on the front axle. Either type of front differential allows the vehicle to be steered without causing undue scrubbing of the tires, but does not provide true four wheel drive operation. If all wheels are on a slippery surface except one of the front wheels, three wheels will spin and the fourth will not drive. This problem is not entirely alleviated by even the limited slip differential. In some full slip front differential systems, the front differential can be locked-in during very low speed operation of the vehicle. Typically such systems require the vehicle to be completely stopped to lock in the differential, necessarily resulting in loss of all vehicle momentum which often allows the vehicle to get stuck. Steering is also somewhat difficult, since all four tires must then rotate at the same speed.

Double acting overrunning clutches have long been used in mechanical operations to allow a driven member to rotate faster than a drive member. See, e.g., U.S. Pat. No. 3,194,369, W. Witte, Double Acting Overrunning Clutch, July 13, 1965. Roller clutches have been used in transfer cases of four wheel drive vehicles to engage the front axle when the rear wheels begin to spin. See U.S. Pat. No. 3,295,625, M. Ordorica, Automatic Four Wheel Drive Transfer Case, Jan. 3, 1967. Roller clutches have also been used in hubs for the front wheels of four wheel drive vehicles. See U.S. Pat. No. 3,788,435, Prueter, Automatic Hub for Four Wheel Drive Vehicles and the Like, Jan. 29, 1974.

It is believed that none of these prior art systems have successfully utilized roller clutches for both side-to side and front to rear differential function as well as providing for automatic engagement of the optionally driven wheels. Furthermore, in applying these prior art systems to four wheel drive vehicles a number of problems have been encountered which prevent safe and efficient operation of the under certain driving condically. Specifically such vehicles typically are driven harder than on-road vehicles such as automobiles and pick-up trucks. During four wheel drive operation, the vehicles encounter frequent stop and start situations, hard braking followed by rapid acceleration, and tight cornering on a relatively short wheel base. For reasons which will be explained in greater detail below, such conditions can cause undesirable locking up of the four wheel drive system in certain circumstances.

DISCLOSURE OF INVENTION

The invention relates to a multiple driven axle vehicle including a chassis, an engine mounted to the chassis, a pair of front wheels and a pair of rear wheels, one of said pairs being steerable and each wheel of at least one of said pairs including a hub having a double acting overrunning clutch, and transmission means for transmitting rotational power from the engine to the wheels. The transmission means desirably is geared to drive one pair of wheels sufficiently slower than the other pair of wheels so that the overrunning clutches of the slower driven wheels do not engage when the steerable wheels are turned as the vehicle is driven through a turn. The overrunning clutch typically includes a roller cage and a plurality of rotatable roller members retained within angularly spaced cavities in the cage. The roller cage spaces the rollers circumferentially from one another and limits circumferential movement of the rollers with respect to the cage while permitting radial movement thereof. The roller clutch also typically includes a generally cylindrical cam or inner member driven by the transmission means and having an outer surface for engaging the roller members. A race or outer member is provided coaxial of the cam and has a generally cylindrical inner surface. The rollers and roller cage are interposed between the cam surface and the race surface. Spring means is provided for urging the rollers generally radially inwardly with respect to the cam axis.

The cam surface includes a circumferential region associated with each roller, said surface being configured so that as the roller cage and rollers rotate in a given direction with respect to the cam, the rollers are urged radially outwardly from a non engaging position into an engaging or engagable position wherein the rollers contact the race surface to engage the cam with the race whenever the transmission means attempts to rotate faster than the wheel.

In one embodiment of the invention intermittent friction means is provided which is operative between the roller cage and a fixed, non-rotating member to intermittently exert a force tending to retard rotation of the cage with respect to the fixed member and the cam. As the cage and rollers are retarded in rotation, they are urged radially outwardly by the cam surface and positioned to immediate engage the race with the cam when the race and associated wheel slow to equal the rotational speed of the transmission means (or when the transmission means attempts to drive the cam faster than the race and associated wheel). Desirably the roller clutch is double acting so that it operates in similar fashion regardless of the direction of rotation of the transmission means—i.e., the system works equally well in forward as reverse.

In a preferred embodiment, the intermittent friction means includes a projection carried by one of the fixed member and the roller cage, and a movable plunger carried by the other of the fixed member and the roller cage, the plunger being oriented to momentarily frictionally engage the projection as the roller cage rotates with respect to the fixed member.

In another embodiment, the invention relates to a cam or inner member having a particular surface configuration. The cam includes a circumferential region associated with each roller. Desirably at least one of the circumferential regions of the cam surface includes impediment means tending to inhibit movement of the associated roller from the central, un-engaged position to the driving position. The impediment means effectively prevents inertia of the roller cage and roller members from causing the cage to rotate from the forward engagable position to the reverse engagable position upon sudden braking of the wheel, stopping it in the central position and thereby preventing undesirable lock up of the system in the opposite rotational mode.

In a preferred embodiment, the circumferential region of the cam includes two such impediment means in the form of ridges, one located adjacent the forward engagable position and the other located adjacent the reverse engaged position. In another preferred embodiment, a single such impediment means is provided adjacent the reverse engagable position; the greatest need for the impediment means occurs in relatively high speed forward operation to prevent undesired lock-up into the reverse engaged position. Such high speeds typically are not encountered in reverse operation, and at lower speeds the inertia of the rollers and cage is not sufficient to overcome the spring means which normally urges the rollers radially inward and therefore rotationally toward the central, unengaged position.

BEST MODE FOR CARRYING OUT THE INVENTION

Figure 1:
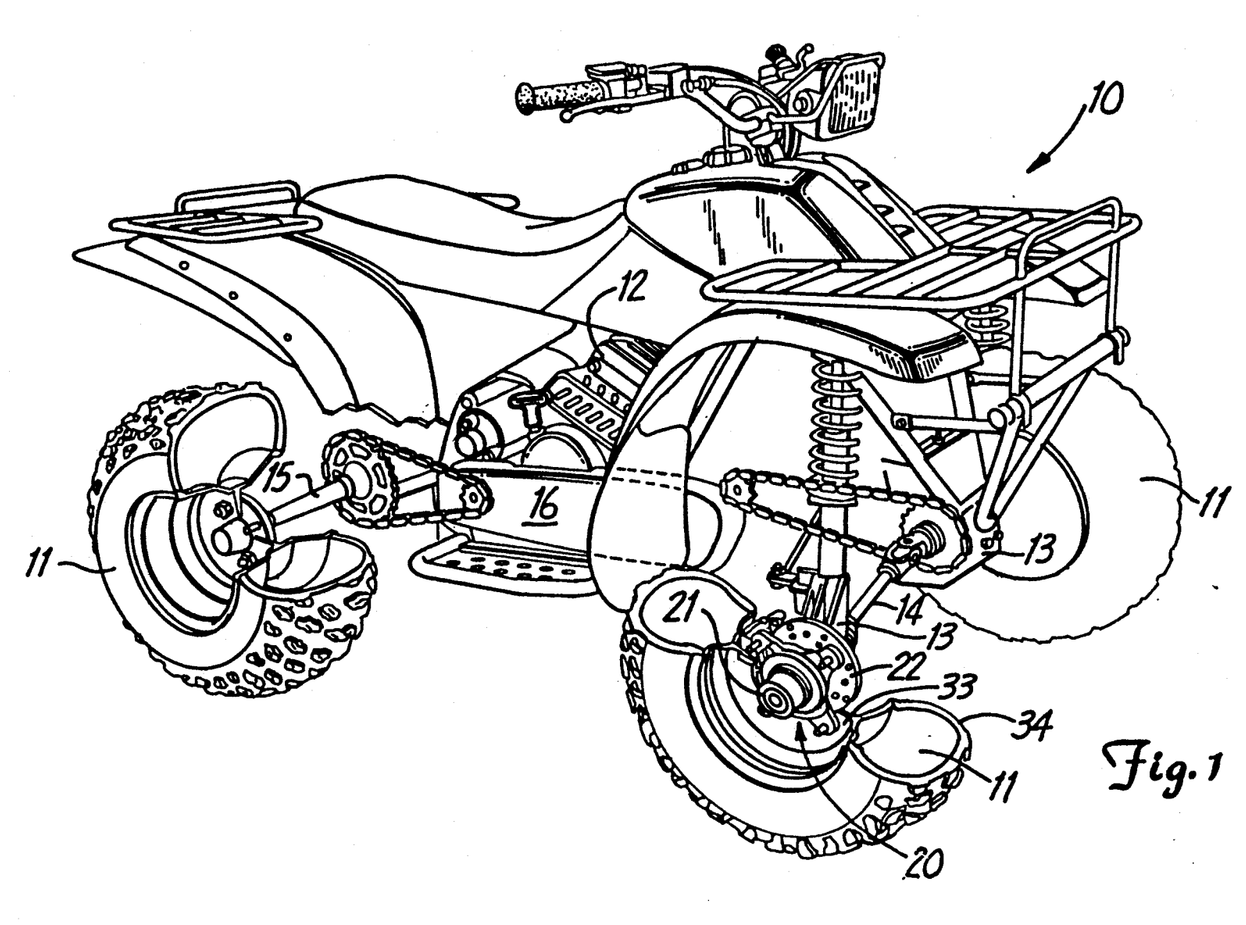
FIG. 1 is a perspective, partially broken-away view of an all-terrain vehicle of the invention.

FIG. 1 depicts a typical all terrain vehicle which utilizes a four wheel drive system in accordance with the invention. It will be understood that aspects of the invention have utility in other vehicles and other similar applications. Similarly, the invention may be applied to vehicles with more than four wheels, such as six or more wheel drive vehicles.

Referring to FIG. 1, an all terrain vehicle (10) has a chassis (13) upon which is mounted an engine (12), a transmission system (16) including front and rear axles (14 and 15) driving wheels (11). In a preferred embodiment, as shown in FIG. 1, the transmission system is configured so that the rear wheels are constantly driven by the transmission mean (16) and the front axle (14) is also constantly driven but connected through the hub assembly (20) of the invention to each of the optionally driven front wheels (11). If desired, the optionally driven wheels might be the rear wheels or even include a center set of wheels in a six wheel drive vehicle.

Although any of a variety of transmission means (16) may be utilized, one such transmission system includes a split sheave variable drive clutch transmission which drives chains connected to sprockets on each of the front and rear axles. As described below in further detail, it is desirable in such applications to gear the front wheels slower than the rear wheels so that, as the vehicle is driven on pavement and similar surfaces where the rear wheels do not slip, the surface drives the front wheels which overrun the front axle, in effect causing the vehicle to be operating in a two wheel (rear wheel) drive mode which provides desirable handling characteristics, 10 includes e.g., allows the front wheels to rotate independent of one another and independent of the rear wheels as the vehicle turns through a corner. Desirably, the front axle is geared so that the front wheels are driven by the ground at a rotational speed approximately 10-30% than the front axle, and preferably about 15-25% faster than the front axle. Thus, assuming identical tire sizes on front and rear wheels, the front axle is geared about 10-30% slower than the rear axle, and preferably about 15-25% slower than the rear axle.

Although a variety of factors may be considered in selecting the gear ratios for the front axle, an important consideration is the differential speeds of the front and rear wheels as they roll through the sharpest corner that the vehicle is capable of turning. In a right-hand turn the front right tire travels through an arc with a relatively short radius. The radii of the outside (left) tire paths are somewhat longer, depending upon the wheel base of the vehicle, the width of the vehicle, and the degree to which the steering wheels can be turned. A vehicle as depicted in FIG. 1 having a wheelbase of about 48 inches and overall width of about 45 inches is capable of turning a circle of approximately fourteen feet in diameter (inside front tire path). The rear outer wheel travels a circle of approximately seventeen feet in diameter, and therefore it is desirable that the front axle be geared approximately 20% slower than the rotational speed that the front wheels are driven by the ground when the vehicle is not turning a corner.

Figure 2:
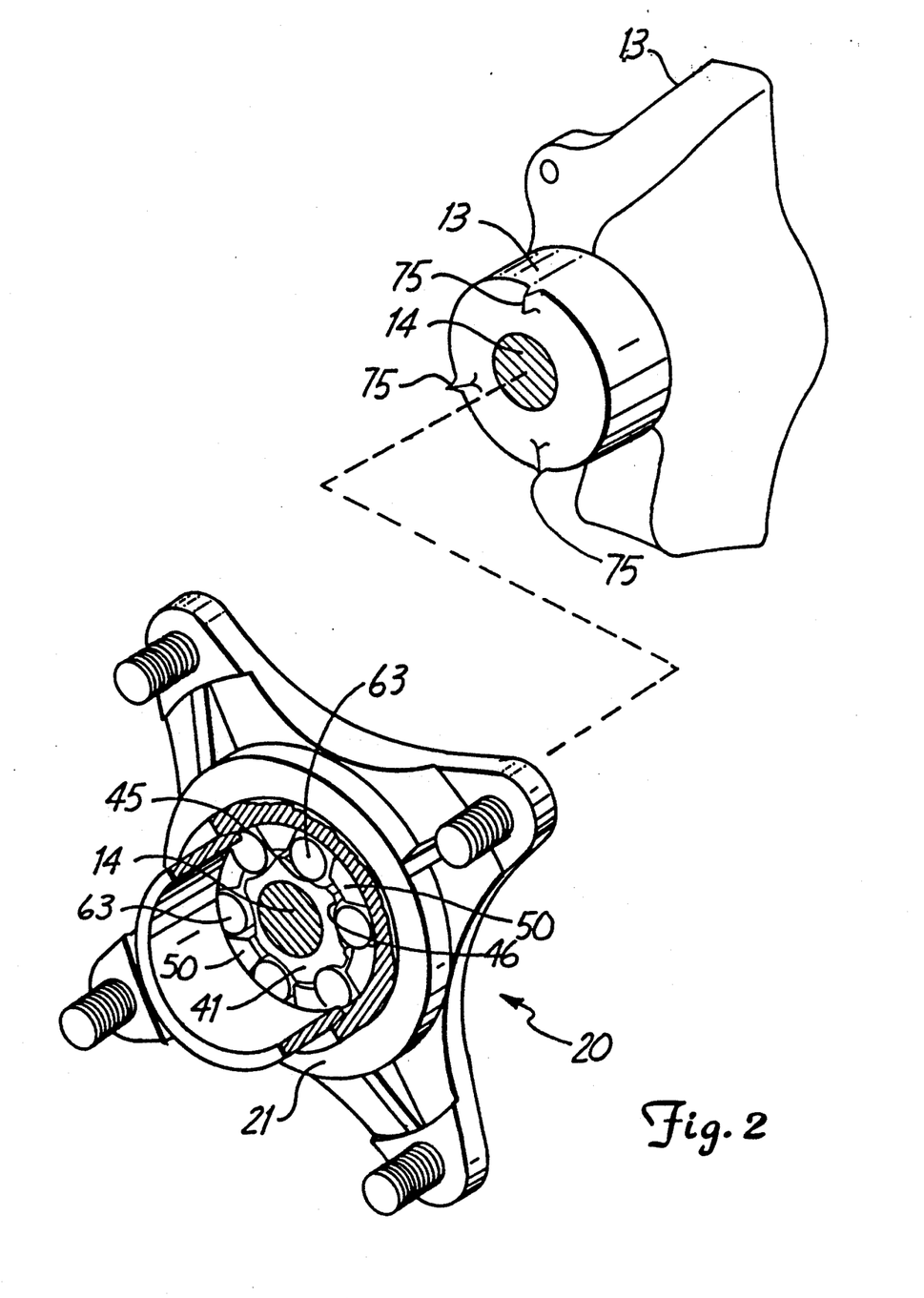
FIG. 2 is a broken-away, partially exploded view of a wheel hub of the invention.
Figure 3:
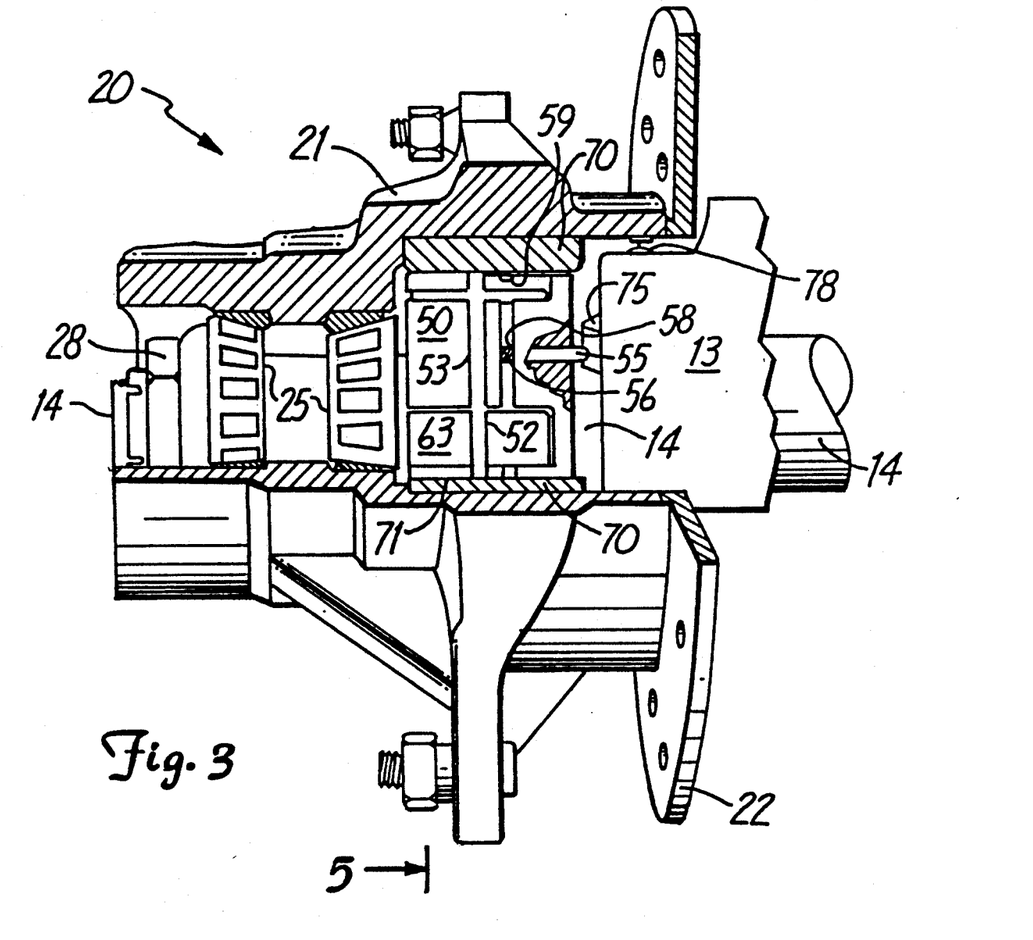
FIG. 3 is a side view in partial cross-section of a wheel hub of the invention.
Figure 4:
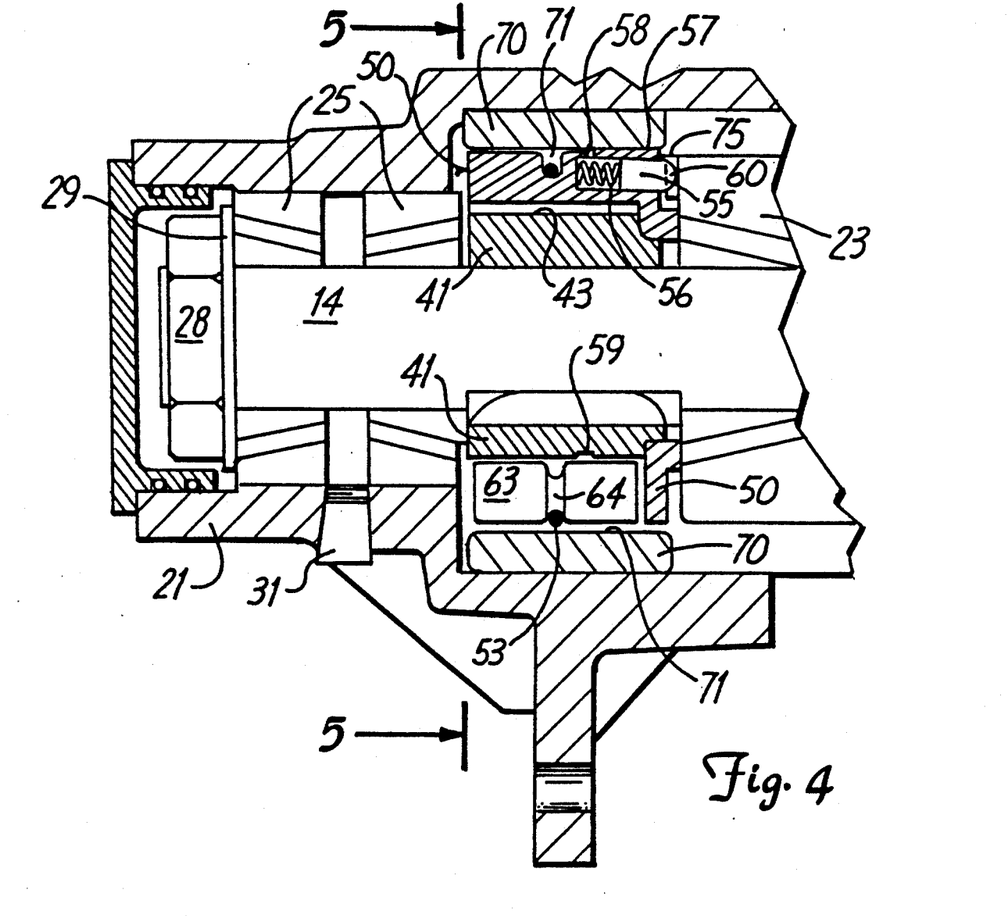
FIG. 4 is a cross-sectional, partially broken away view of a wheel hub of the invention.

A hub assembly (20) is provided on optionally driven wheels (11) to allow those wheels to overrun their driving axles. Referring to FIGS. 2-4, the hub assembly (20) includes an outer hub (21) to which a wheel rim (33) may be bolted for carrying the tire (34) of a wheel (11). Where disc brakes are provided on the wheel, the rotating outer hub (21) may also carry the brake disc (22) about which a disc brake caliper (not shown for clarity) may be mounted.

The driving axle (14) is mounted to a frame member of the chassis (13) by means of suitable bearings such as the inboard tapered roller bearings (23) depicted in the drawings. The bearings (23) are shown schematically in FIG. 4 for the sake of clarity. The outer hub (21) is similarly mounted rotatably to the axle (14) by means of outboard bearings such as tapered roller bearings (25). In a preferred embodiment the entire hub assembly (20) is sealed by suitable O rings and dynamic seals against intrusion of foreign matter, the interior cavity being at least partially filled with a suitable oil or similar lubricant. A drain plug (31) may be provided for draining and filling the lubricant.

A roller clutch mechanism, designated generally as (40) includes a cam (41) engaged with the drive axle (14) by means of a key (42). Concentric about the cam (41) is a race (70) rigidly affixed to or integral with the outer hub (21). The race includes an inner surface (71) which is preferably generally smooth Interposed between the outer surface (43) of the cam (41) and the inner surface (71) of the race (70) are a plurality of rollers (63) retained in cavities (51) of a roller cage (50). Each roller (63) is associated with a circumferential area of the outer surface (43) of the cam (41).

The rollers (63) are urged radially inward by garter spring (53). As can be seen in FIG. 4, each of the rollers includes a slot portion (64) for receiving the garter spring (53). The roller cage (50) similarly includes a channel (52) for receiving the garter spring (53). Desirably, the channel (52) is sufficiently deep so that the garter spring (53) exerts most of its radially inwardly directed force on the rollers (63) and not on the roller cage (50) itself.

Prior art cams for double acting roller clutches of the type utilized in the invention typically are regular polygons. one roller being associated with each flat portion of the polygon. Typically, the roller cage is mechanically braked against a stationary part of the vehicle frame by way of gentle brake shoes or a wave spring. See, e.g., U.S. Pat. No. 3,788,435, Prueter, Automatic Hub for Four Wheel Drive Vehicles and the Like, Jan. 29, 1974. Thus, as the axle begins to rotate, the roller cage lags behind, indexing the rollers along their respective surfaces of the polygonal cam to urge them outwardly into engagement with the race, thus locking the axle to wheel unidirectionally—i.e., the wheel is driven by the axle but is nevertheless free to overrun the axle.

Utilizing such a roller clutch in the present invention, if the optionally driven wheels (e.g., the front wheels) are driven by the ground 20% faster than the front axle, then as the vehicle is traveling down a smooth dry surface, the roller cage will index the rollers to the forward engaged position; the front wheels overrun the axle, but the rollers are in position so that if the rear wheels begin to slip and the front axle attempts to rotate faster than the front wheel, the rollers immediately engage the race to provide positive driving force and traction to the wheel. Similarly, if the vehicle is driven in reverse the roller cage will index the rollers to the reverse locking position, allowing the wheels to overrun the axle so long as traction on the rear wheels is maintained. As soon as the rear wheels begin to slip more than 20%, the rollers positively engage the race to drive the front wheels.

It has been found that in certain situations, the regular polygonal cam surface does not provide for proper function of the roller clutch. For example, when a vehicle is traveling at a significant speed, the substantial mass of the roller cage (50) and rollers (63) provides a significant amount of inertia. Upon sudden braking of the front wheels, the inertia tends to thrust the roller cage and rollers out of the forward engaged position toward the reverse engagable position. Although the garter spring (53) tends to bias the rollers toward the center section (45) of the surface area associated with each roller, significant inertia may overcome the garter spring (53) causing the rollers to reach the reverse engagable position.

If, for example, sudden braking is followed by an immediate release of the brakes, it is possible for the inertia of the rollers on a regular polygonal cam to be thrust into the reverse engagable position and engage the outer hub even while the vehicle continues in the forward direction. If a front wheel becomes so engaged, the front tire will be positively engaged 20% slower than the rear wheels are driven, and will not be capable of overrunning (since in the reverse engaged position the hubs are designed to overrun in the reverse direction, not in the forward direction). If only one of the front two hubs picks up the rollers in the reverse mode during forward travel, handling of the vehicle may be affected; in fact, if only rear brakes are applied by the operator during this condition, the braking of the rear wheels will be transmitted through the transmission means to the front wheel which is engaged on the reserve side, resulting in three wheel braking. Three wheel braking can be particularly undesirable if the vehicle is traveling very fast and/or on slippery surfaces such as ice or gravel.

Figures 5, 6, 7:
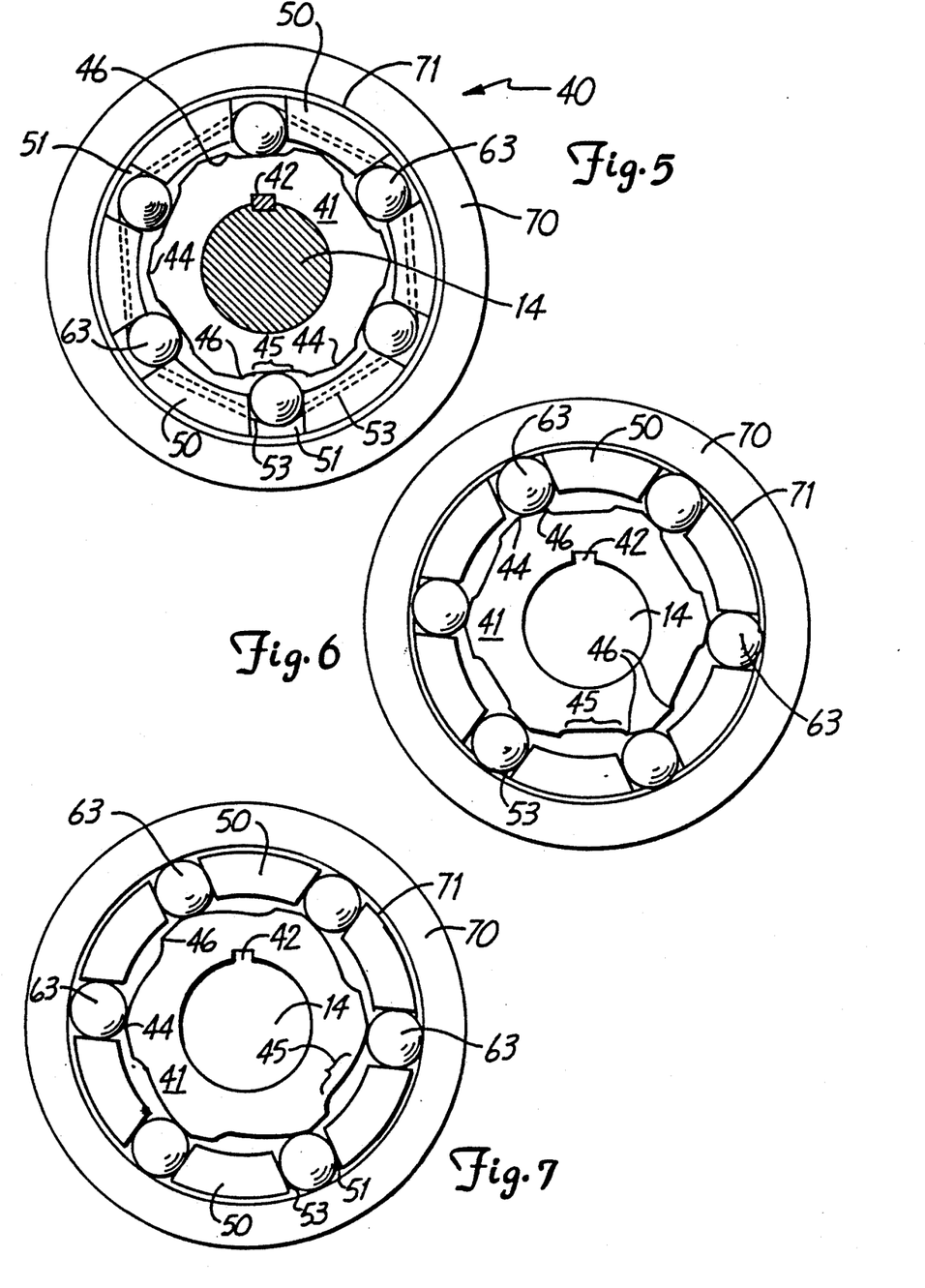
FIG. 5 is a cross-sectional view of FIG. 4 taken along line 5—5 thereof.
FIG. 6 is a cross sectional view similar to FIG. 5 showing the roller clutch in the engagable position.
FIG. 7 is a cross sectional view of a hub of a different embodiment.

To alleviate the undesirable effect of the rollers and roller cage inertia, the cam (41) of the invention includes impediment means (46) which tends to inhibit rotation of the rollers (63) with respect to the cam (41). In FIG. 5, the cam (41) is shown with a preferred impediment means comprising symmetrical ridges operative in both forward and reverse directions. Because speeds at which the inertia becomes a problem are not typically reached in reverse, the desired effect may be accomplished through provision of a single ridge, desirably adjacent the reverse engaged position, as shown in FIG. 7. Thus, when the rollers are in the forward engaged position, as shown in FIG. 7, upon severe braking the inertial movement of the rollers (63) and roller cage (50) are stopped by the ridge (46), preventing the rollers (63) from traveling to the reverse engagable position.

The surface of the cam (41) associated with each roller (63) generally includes a central area corresponding to disengagement of the roller from the race, and respective forward and reverse engagable areas on opposite sides of the central area corresponding to engagement of the associated roller with the race in forward and reverse rotational directions respectively. Where single ridge (46) is provided for a roller (63), the ridge desirably is located between the reverse engagable area and at least a portion of the central area corresponding to disengagement. Where two such ridges (46) are provided, desirably one of them is located adjacent the forward engagable are and the other located adjacent the reverse engagable area, the two ridges (46) defining between them at least a portion of the central, unengagable area.

Viewed in cross section, the cam surface region associated with a particular roller is defined by a pair of points comprising boundaries between adjacent circumferential regions, such points being located generally radially outwardly of other portions of the cam.

The constant drag mechanisms described in the Prueter patent, when utilized in a four wheel drive vehicle, give rise to additional lock up problems similar to those discussed above. For example, occasionally when a vehicle is driven in reverse and then shifted into a forward gear, lock up can occur. As the vehicle is being backed up, the constant drag of the roller cage on the chassis frame will index the rollers to the reverse engagable position. When the vehicle is stopped and shifted into a forward gear, the garter spring by necessity does not have sufficient force to overcome the constant drag mechanism and return the rollers to the central position.

To alleviate lock-up due to the constant drag system, the roller clutch of the invention is provided with an intermittent drag system which facilitates return of the rollers and roller cage to the central position with respect to the cam (41) whenever the vehicle is not moving, as when the vehicle is shifted from reverse to forward, or vice versa. Although any of a variety of intermittent drag systems would suffice in the current application, a preferred intermittent drag system includes a set of resiliently mounted plungers (55) and complimentary projections (75) carried respectively on the roller cage (50) and the stationary frame (13) of the vehicle chassis immediately adjacent the roller cage (50). Although the plungers (55) are shown in the drawings as being mounted in the roller cage (50) and the projections (75) mounted to the frame (13), the locations of these components could be reversed if desired.

A cylindrical plunger cavity (57) is formed in the roller cage (50) for closely receiving a generally cylindrical shaped plunger (55). The plunger (55) is biased by a spring (56) carried in the plunger cavity (57). To obtain the necessary spring constant for the spring (56), it has been found desirable to use either a coil spring in combination with a resilient rubber spring support carried coaxially within the coil spring, or simply to use a resilient rubber insert as the spring in lieu of the coiled steel spring.

Because the entire roller clutch unit is at least partially immersed in oil or similar lubricant, it is desirable to provide hydraulic relief of the plunger cavity (57) by forming relief port (58) in the plunger cavity extending radially outwardly through the wall of the roller cage (50).

The projections (75) on the frame (13) are placed in an interfering relationship with the ends of the plungers (55). Desirably the ends of the plungers (55) have a generally hemi-spherically shaped surface (60). Similarly, desirably the projections (75) are generally tapered or semi-circular in cross-section. Thus, as a plunger (55) approaches a projection (75), the complimentary surfaces of the two structures will cause the plunger (55) to compress the spring (56) and to be cammingly depressed into the plunger cavity (57), allowing the roller cage to rotate so that the plunger (55) passes the projections (75). The force required to depress the plunger (55) is translated into a frictional force tending to retard rotation of the roller cage (50) with respect to the cam (41), thereby indexing the rollers (63) to the engagable position with respect to the cam surface (43). Although any desirable number of plungers and projections may be utilized, it has been found that three of each, equiangularly spaced, provide the desirable amount of intermittent friction.

To reduce the likelihood of the roller cage (50) coming to rest and remaining at rest in a position where the plunger (55) is depressed by the projection (75), the projection may be configured with a pair of sloped surfaces meeting at a generally pointed ridge, rather than merely being semi-circular in cross-section. Thus, if the vehicle is stopped when the plungers (55) and projections (75) are roughly in registry, the plunger springs (56), together with the force of the garter spring (53), will generally be sufficient to at least slightly rotate the roller cage (50) to disengage the rollers (63) from the race (70).

Because the friction means of the invention is intermittent rather than constant, when the vehicle is at rest generally no frictional force exists and the force of the garter spring (53) on the rollers (63) is sufficient to cause the rollers to move toward the center position of the cam (41) to disengage the rollers (63) from the race (70), returning the rollers to the neutral, central position.

In operation, a vehicle provided with double acting overrunning clutches in the hubs of optionally driven wheels, such as the front wheels of a four wheel drive vehicle, is constructed having a gearing ratio such that the optionally driven wheels are driven by the ground faster than their respective axles, e.g., twenty percent faster. On a good driving surface where no tire slippage occurs, the optionally driven wheels will be driven by the surface so that they rotate faster than their respective drive axles. As the axle and wheels rotate, the intermittent friction system causes the roller cage (50) and rollers (63) to be indexed toward the forward position of engagability of the rollers (63) with the race surface (71). In this position, although the rollers are in contact with the inner surface (71) of the race, the race (70) and associated hub and wheel are free to overrun.

If the constantly driven wheels (e.g., rear wheels) slip sufficiently, the optionally driven wheels will slow to equal the cam speed and become engaged and will drive until the rear wheel slippage is alleviated sufficiently, at which time they will resume their overrunning mode. Because the overrunning clutch is double acting, the functions described occur similarly in reverse operation of the vehicle.

Providing hubs in accordance with the invention on a four wheel drive vehicle allows the vehicle to normally drive in two wheel drive mode, and automatically engages the optionally driven wheels upon slippage of the rear wheels. Proper gearing of the front and rear axles allows the hubs to serve as a differential between the steering wheels and as a differential between the front and rear wheels, eliminating these costly components from the vehicle while providing independent rotation of the steering wheels to avoid undue tire scrubbing and wear on related components.

If the vehicle is in forward operation and sudden braking occurs, inertia of the rollers (63) and roller cage (50) will tend to index the roller cage (50) from the forward engagable position toward the reverse engagable position. The ridge (46) of the cam (41) tends to inhibit indexing toward the reverse engaged position, effectively preventing the system from erroneously locking up in the reverse position.

When the vehicle is stopped after either forward or reverse movement, the intermittent friction means permits the roller cage (50) and rollers (63) to return toward a central, unengagable position, ready for movement in either forward or reverse direction without unintended locking up.

The hub of the invention may be manufactured by well known manufacturing techniques utilizing commonly available materials and components. Desirably, most of the components of the hub of the invention are manufactured from suitable metal alloys to provide the necessary strength and durability. As the roller cage (50) absorbs little force apart from the intermittent frictional force, it may be manufactured from aluminum or suitable plastics.

Figure 8:
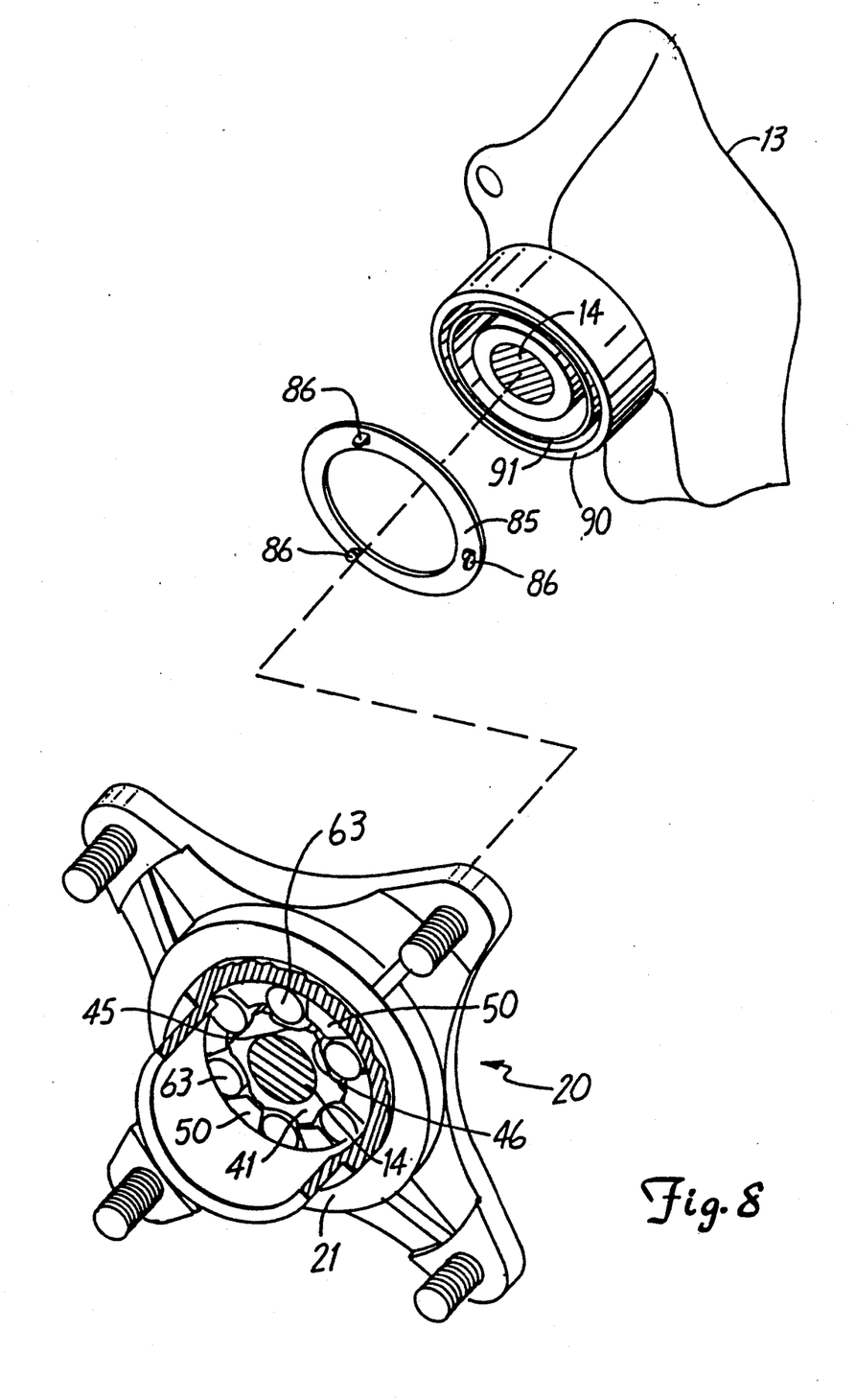
FIG. 8 is a perspective, exploded view of an alternative embodiment of the invention.
Figure 9:
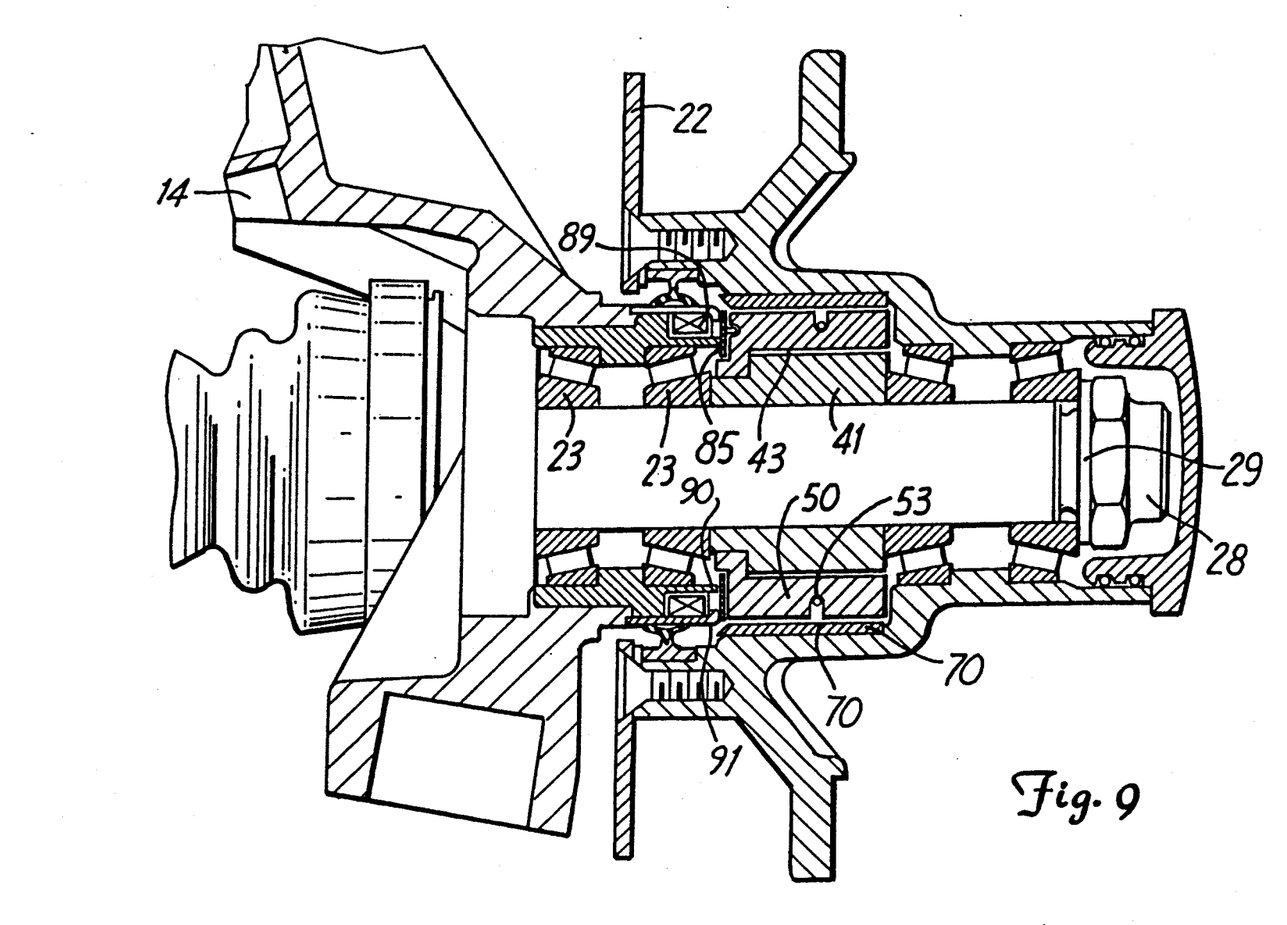
FIG. 9 is a cross sectional view of the embodiment of FIG. 8.
Figure 10:
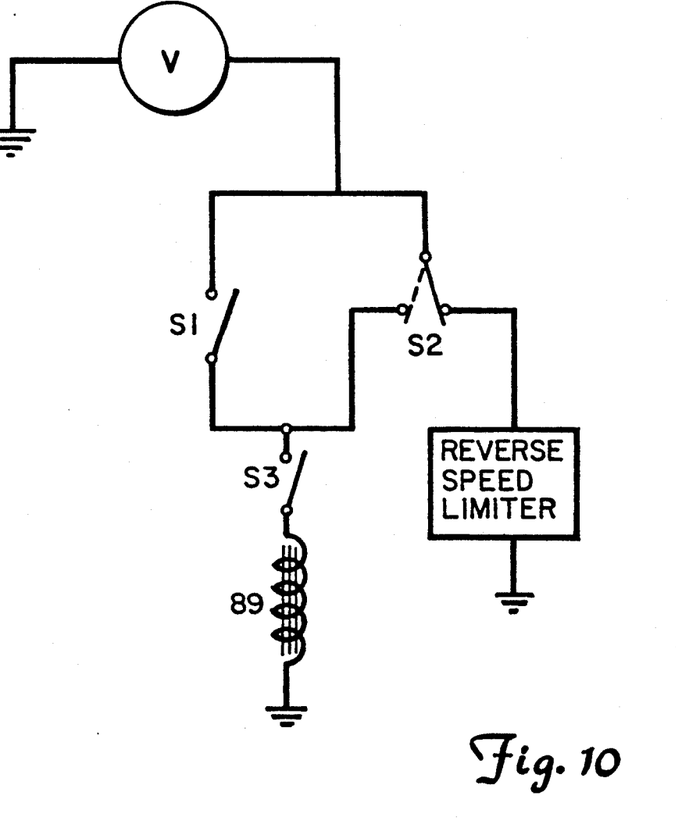
FIG. 10 is a schematic view of an electrical circuit of the embodiment of FIGS. 8-9.

In an alternative embodiment, depicted in FIGS. 8 10, the intermittant drag system is comprised of an electromagnetic coil (89) embedded in the frame (13) adjacent the roller cage (50). An armature plate (85), generally shaped as a flat ring, includes a plurality of prongs (86) (preferably three, generally equiangularly spaced) extending perpendicular to the plane of the plate (85), the prongs being receivable in complementary cavities (51) in the roller cage (50). (In this embodiment, the plungers (55) and projections (75) are unnecessary. The prongs (86) are receivable in cavities (51) very similar to the ones the plungers (55) are carried in in the embodiment of FIGS. 3-4, however.) The prongs (86) are carried in the cavities (51) loosely enough to permit the armature plate (85) to float between the frame (13) and the roller cage (50). This configuration permits the armature to rest squarely against the frame, assuring good contact therebetween to produce the necessary friction for properly biasing the roller cage, and accommodating any slight differences in axial alignment of the roller cage (50) with respect to the frame (13).

The frame (13) in which the coil (89) is embedded is actually split into inner and outer ferro-magnetic poles (91) and (90), respectively, for engagement with the armature plate (85) when the coil is energized. In a particularly preferred embodiment, the inner pole (91) is slightly shorter than the outer pole (90), i.e., in the longitudinal direction parallel to the axle (14) (see FIG. 9). The armature plate (85) therefore rides against only the outer pole (90) and remains spaced from the inner pole by, e.g., several thousandths of an inch. Because the armature plate (85) is not in contact with the inner pole, when the coil (89) is de-energized the strength of the magnetic field dissipates much more rapidly.

Such rapid dissipation is desireable, particularly when changing direction, as from forward to reverse or vice versa, as it reduces the length of time that the rollers are retained in the forward engagable position. It is generally desirable that the field dissipate quickly enough that the rollers return to the central, unengagable position before the vehicle begins to move in the opposite direction. If the vehicle does begin to move in the opposite direction prior to the rollers moving away from the engagable position. the rollers (63) will be caught and wedged between the inner surface (71) of the race (70) and the outer surface (43) of the cam (41) as the race begins to move in the opposite direction. This locks the race and the cam together, allowing the race (and therefore the wheel) to rotate only as fast as the cam, thus preventing the race (and wheel) from overrunning as it is intended to do under normal operating conditions.

In operation, when the coil (89) is energized, it creates a magnetic field attracting the armature plate (86), pulling it into frictional contact with the frame (13), and therefor creating the necessary drag to properly bias the roller cage (50) to the proper engagable position. When the coil is de-energized, the field dissipates, permitting the armature plate to float freely between the frame (13) and the roller cage (50), substantially removing the frictional contact of the armature plate with the frame, and thus allowing the roller cage to return to the central, unengagable position.

FIG. 10 depicts a schematic diagram of a preferred electrical wiring configuration for the coil. In this embodiment, current from the vehicle's electrical system or battery (V) flows to the coil (89) when either switch S1 or switch S2 closes the circuit to the coil. Switch S1 is associated with the shifting of the vehicle, and is automatically closed when the vehicle is shifted into a forward gear. When the vehicle is shifted out of forward, switch S1 is opened, the coil is de-energized, and the rollers return to the central, engagable position. Switch S2 is a single pole, double throw switch and is associated with manual override of a reverse speed limiting circuit. (For safety reasons in this vehicle, reverse speed is normally limited by an electronic circuit that cuts ignition in the engine when reverse RPM's exceed a preset threshhold.) When the rider desires to override the reverse speed limiter, generally it is because greater power is temporarily required, as when one is stuck, or pulling a heavy load in reverse or backing up a steep incline. Pushing the momentary contact switch (S2) on the handlebar breaks the circuit to the reverse speed limiter, enabling the rider to override the reverse speed limiter while simultaneously closing switch S2 to energize the coil and put the vehicle in potentially four-wheel drive mode (i.e., should the rear wheals slip the clutch will engage).

In another embodiment in a vehicle without a reverse speed limiter, a conveniently located single pole, single throw switch could be used instead of the single pole, double throw switch S2 to give the same effect. In yet a third embodiment, all switching would be associated with the shifting of the vehicle. When shifting out of a forward gear, the coil would be de-energized and the roller cage would return to the central, unengagable position. When shifting into reverse, the coil would be energized again, and the frictional drag would properly bias the roller cage to the reverse engagable position.

In all three of these embodiments, it should be recognized that an additional manual switch S3 can be used in series with the coil if it is desired to run the vehicle in two wheel drive at all times, even when the rear wheels spin. This may be desirable when turning sharply in some circumstances, or for other performance reasons. When it is desired to have four wheel drive capability, the switch S3 can be turned on and the coils energized while the vehicle is moving. When the coil is energized, if the cam is turning slower than the wheel hub, the hub will overrun and no effect will be noticed. If the cam is turning faster than the hub (i.e., if the rear wheels are slipping), then the front wheels will be driven by the drive train, as desired.

While a preferred embodiment of the present invention has been described, it should be understood that various changes, adaptations and modifications may be made therein without departing from the spirit of the invention and the scope of the appended claims.

What is claimed is:

1. A multiple driven axle vehicle including a chassis, an engine mounted to the chassis, a pair of front wheels and a pair of rear wheels, one of said pairs being steerable and each wheel of at least one of said paris including a hub having a double acting overrunning clutch, each of the overrunning clutches including a generally cylindrical cam driven by the transmission means and having an outer surface and a longitudinal axis;

a race coaxial of the cam and having an inner generally smooth cylindrical surface;

a plurality of generally cylindrical, circumferentially spaced rollers interposed between the cam surface and the race surface, the rollers having longitudinal axes generally parallel to the cam axis;

spring means for urging the rollers generally radially inwardly with respect to the cam axis; and a roller cage rotatable with respect to the cam and the race, the roller cage spacing the rollers circumferentially from one another and limiting circumferential movement of the rollers with respect to the cage while permitting radial movement thereof;

the cam surface having a circumferential region associated with each roller, said cam surface being configured so that as the roller cage and rollers rotate in a given direction with respect to the cam, the rollers are urged radially outwardly from a free-wheeling position into a driving position wherein the rollers contact the race surface to operatively engage the cam with the race whenever the transmission means attempts to rotate faster than the wheel;

at least one of the circumferential regions of the cam surface including impediment means tending to inhibit movement of the associated roller from the free-wheeling position to the driving position upon sudden reduction of the rotational speed of the cam;

and transmission means for transmitting rotational power from the engine to the wheels, the transmission means being geared to drive one pair of wheels sufficiently slower than the other pair of wheels so that the overrunning clutches of the slower driven wheels do not engage when the steerable wheels are turned as the vehicle is driven through a turn, the overrunning clutches and transmission means thereby coacting to eliminate the need for a differential between the slower driven wheels.

2. The vehicle of claim 1 wherein the overrunning clutch includes intermittent friction means operative between the roller cage and the vehicle chassis to intermittently exert a force tending to retard rotation of the cage with respect to the chassis.

3. The vehicle of claim 2 wherein the intermittent friction means includes a projection carried by one of the frame and the roller cage, and a movable plunger carried by the other of the frame and the roller cage, the plunger being oriented to momentarily frictionally engage the projection as the roller cage rotates with respect to the frame.

4. The vehicle of claim 3 wherein the plunger is movable along a longitudinal axis and includes means for biasing the plunger toward said one of the frame and the roller cage.

5. The vehicle of claim 3 wherein an end of the plunger located adjacent said one of the frame and the roller cage is generally hemi-spherically shaped.

6. The vehicle of claim 3 wherein the projection is oriented along a radius extending from an axis about which the roller cage rotates, the projection having a generally tapered cross-section taken along a plane normal to said radius.

7. The vehicle of claim 1 including two such impediment means associated with each of said at least one circumferential region.

8. The vehicle of claim 7 wherein the area of the cam surface between said two impediment means is generally concave in cross-section, each of said two impediment means comprising a longitudinal ridge.

9. The vehicle of claim 7 including two such adjacent circumferential regions each having two such impediment means, the area of the cam surface between the impediment means of one of said regions and the adjacent impediment means of the other region being generally convex in cross-section.

10. The vehicle of claim 1 wherein the cam has a generally constant cross-section along its length, each said circumferential region being defined by a pair of lines comprising boundaries of adjacent circumferential regions, each said line lying generally parallel to the cam axis and being located radially outwardly of other portions of the cam.

11. The vehicle of claim 1 wherein each such circumferential region includes a central area corresponding to disengagement of the associated roller from the race, and respective forward and reverse engaged areas on opposite sides of the central area corresponding to engagement of the associated roller with the race in forward and reverse rotational directions respectively.

12. The vehicle of claim 11 wherein the impediment means comprises a ridge located between at least a portion of the central area and the reverse engaged area.

13. The vehicle of claim 11 wherein the impediment means is located between the central area and the forward engageable area and another impediment means is located between the central area and the reverse engagable area.

14. The vehicle of claim 1 wherein the vehicle includes four wheels, the front wheels being steerable and driven slower than the rear wheels.

15. The vehicle of claim 14 wherein the front wheels are driven about 10% to about 30% slower than the rear wheels.

16. The vehicle of claim 1 wherein the overrunning clutch includes electromagnetically controllable friction means operative between the roller cage and the vehicle chassis to selectively exert a force tending to retard rotation of the cage with respect to the chassis.

17. The vehicle of claim 16 wherein the electromagnetically controllable friction means includes an electromagnetic coil carried by the vehicle chassis, and an armature plate interposed between the vehicle chassis and the roller cage, the armature plate being movable therebetween in response to activation of the coil to exert a force tending to retard rotation of the cage with respect to the chassis.

18. The vehicle of claim 17 wherein the chassis includes an inner, generally annular pole, and an outer, generally annular pole, each associated with the coil and having an annular surface adjacent to the armature plate.

19. The vehicle of claim 18 wherein one of the poles extends axially beyond the other so that the armature plate may contact only one of the poles 20. The vehicle of claim 17 wherein the armature plate comprises a generally flat, annular ring having a plurality of prongs extending axially therefrom, the prongs being receivable in complimentary cavities in the roller cage and functioning to transmit rotational drag forces to the roller cage.

21. The vehicle of claim 16 wherein the electromagnetic friction means include switch means associated with the transmission means for energizing the friction means when the vehicle is shifted into a forward gear, and for de-energizing the friction means when the vehicle is shifted out of the forward gear.

22. The vehicle of claim 20 wherein the electromagnetic friction means includes manual switch means operable by a rider of the vehicle to manually engage the friction means.

23. The vehicle of claim 22 wherein the vehicle includes reverse speed limiter means for limiting the reverse speed of the vehicle, and wherein the manual switch cans is also operable to override the reverse speed limiter means.

24. A multiple driven axle vehicle including a chassis an engine mounted to the chassis, a pair of front wheels and a pair of rear wheels, one of said pairs being steerable and each wheel of at least one of said pairs including a hub having a double acting overrunning clutch, and transmission means for transmitting rotational power from the engine to the wheels, the transmission means being geared to drive one pair of wheels sufficiently slower than the other pair of wheels so that the overrunning clutches of the slower turned wheels do not engage when the steerable wheels are turned as the vehicle is driven through a turn, each of the overrunning clutches including a generally cylindrical cam driven by the transmission means and having an outer surface and a longitudinal axis;

a race coaxial of the cam and having an inner generally smoother cylindrical surface;

a plurality of generally cylindrical, circumferentially spaced rollers interposed between the cam surface and the race surface, the rollers having longitudinal axes generally parallel to the cam axis;

spring means for urging the rollers generally radially inwardly with respect to the cam axis; and a roller cage rotatable with respect to the cam and the race, the roller cage spacing the rollers circumferentially from one another and limiting circumferential movement of the rollers with respect to the cage while permitting radial movement thereof;

the cam surface having a circumferential region associated with each roller, said cam surface being configured so that as the roller cage and rollers rotate in a given direction with respect to the cam, the rollers are urged radially outwardly from a free-wheeling position into a driving position wherein the rollers contact the race surface to operatively engage the cam with the race whenever the transmission means attempts to rotate faster than the wheel, at least one of the circumferential regions of the cam surface including ridge means tending to inhibit inertial movement of the associated roller from the free-wheeling position to the driving position as when the hub is suddenly braked;

the overrunning clutch further including intermittent friction means operative between the roller cage and the vehicle chassis to intermittently exert a force tending to retard rotation of the cage with respect to the chassis.

* * * * *

UNITED STATES PATENT AND TRADEMARK OFFICE
CERTIFICATE OF CORRECTION

PATENT NO. : 5,036,939

DATED : August 6, 1991

INVENTOR(S) : Mitchell Johnson, Robert Eastman, David C. Ochab, and Grover D. Fraser It is certified that error appears in the above—identified patent and that said Letters Patent is hereby corrected as shown below:

Title page, item (75):
Add to list of inventors:

Grover D. Fraser, Painted Post, New York

Signed and Sealed this

Fifteenth Day of December, 1992

Attest:

DOUGLAS B. COMER

Attesting Officer

Acting Commissioner of Patents and Trademarks